United States Patent
Fujii et al.

(10) Patent No.: US 11,519,495 B2
(45) Date of Patent: Dec. 6, 2022

(54) HEAT LOAD ESTIMATION DEVICE AND HEAT LOAD ESTIMATION METHOD FOR FRICTION ENGAGING ELEMENT

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Koichi Okuda, Toyota (JP); Ken Imamura, Toyota (JP); Hideaki Bunazawa, Nagoya (JP); Keita Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 17/340,153

(22) Filed: Jun. 7, 2021

(65) Prior Publication Data
US 2022/0042594 A1 Feb. 10, 2022

(30) Foreign Application Priority Data
Aug. 6, 2020 (JP) .............................. JP2020-133951

(51) Int. Cl.
*F16H 59/72* (2006.01)
(52) U.S. Cl.
CPC ....... *F16H 59/72* (2013.01); *F16H 2059/725* (2013.01)
(58) Field of Classification Search
CPC .......................... F16H 59/72; F16H 2059/725
See application file for complete search history.

(56) References Cited

U.S. PATENT DOCUMENTS

| | | | |
|---|---|---|---|
| 8,744,706 B2* | 6/2014 | Takaishi | F16H 61/0021 701/56 |
| 2004/0242360 A1* | 12/2004 | Nakayashiki | F16H 61/20 475/120 |
| 2006/0293146 A1* | 12/2006 | Nakayashiki | F16H 59/72 477/76 |
| 2017/0274905 A1* | 9/2017 | Sugawara | B60W 10/026 |

FOREIGN PATENT DOCUMENTS

| | | | |
|---|---|---|---|
| JP | 2010-038225 A | 2/2010 | |
| JP | 2011144815 A * | 7/2011 | ............. F16H 61/14 |

* cited by examiner

*Primary Examiner* — Tisha D Lewis
(74) *Attorney, Agent, or Firm* — Oliff PLC

(57) ABSTRACT

A heat load estimation device for a friction engaging element that estimates a heat load when at least one of a temperature, a heat generation amount, and presence or absence of seizure in the friction engaging element at a time of shifting of the transmission is regarded as the heat load, includes a storage device and an execution device. The storage device stores mapping data defining mapping. The mapping includes, as an input variable, a speed variable that is a variable indicating a relative rotation speed of members of the friction engaging element and a hydraulic pressure variable that is a variable indicating hydraulic pressure during the shifting of the transmission, and includes, as an output variable, the heat load. The execution device executes a calculation process for calculating a value of the output variable and a change process for changing an execution mode of the calculation process.

12 Claims, 5 Drawing Sheets

HEAT LOAD ESTIMATION DEVICE AND HEAT LOAD ESTIMATION METHOD FOR FRICTION ENGAGING ELEMENT

CROSS-REFERENCE TO RELATED APPLICATION

This application claims priority to Japanese Patent Application No. 2020-133951 filed on Aug. 6, 2020, incorporated herein by reference in its entirety.

BACKGROUND

1. Technical Field

The present disclosure relates to a heat load estimation device and a heat load estimation method for a friction engaging element.

2. Description of Related Art

Japanese Unexamined Patent Application Publication No. 2010-38225 (JP 2010-38225 A) describes a device that estimates the temperature of a friction engaging element based on the relative rotation speed of members of the friction engaging element that rotate relative to each other, the input torque of the friction engaging element, and the engine rotation speed.

SUMMARY

For the friction engaging element, it is desired to accurately estimate the heat load such as the temperature, the heat generation amount, or the presence or absence of seizure therein. Therefore, the present disclosure provides a heat load estimation device and a heat load estimation method that accurately estimate the heat load such as the temperature, the heat generation amount, or the presence or absence of seizure in the friction engaging element.

A first aspect of the present disclosure relates to a device that is applied to a vehicle provided with a transmission including a friction engaging element that operates with hydraulic pressure, and that is configured to estimate a heat load when at least one of a temperature, a heat generation amount, and presence or absence of seizure in the friction engaging element at a time of shifting of the transmission is regarded as the heat load. This heat load estimation device for the friction engaging element includes an execution device and a storage device. The storage device is configured to store mapping data defining mapping. The mapping includes, as an input variable, a speed variable that is a variable indicating a relative rotation speed of members of the friction engaging element that rotate relative to each other during the shifting of the transmission and a hydraulic pressure variable that is a variable indicating the hydraulic pressure supplied to the friction engaging element during the shifting of the transmission, and includes, as an output variable, the heat load. The execution device is configured to execute a calculation process for calculating a value of the output variable by acquiring a value of the input variable and inputting the value to the mapping, and a change process for changing an execution mode of the calculation process during the shifting of the transmission.

The higher the relative rotation speed between members of the friction engaging element that rotate relative to each other, the larger the heat generation amount of the friction engaging element. Further, the higher the hydraulic pressure supplied to the friction engaging element during the shifting, the larger the heat generation amount of the friction engaging element. Therefore, according to the heat load estimation device for the friction engaging element of the first aspect, the speed variable indicating the relative rotation speed related to the amount of heat generated in the friction engaging element during the shifting and the hydraulic pressure variable indicating the above hydraulic pressure are used as input variables, and these input variables are input to the mapping defined by the mapping data to calculate the heat load described above. Since the state of the friction engaging element changes from the released state to the engaged state during the shifting, the heat generation state of the friction engaging element during the shifting changes in various ways. Thus, the execution mode of the calculation process for calculating the heat load is changed during the shifting. Therefore, the heat load of the friction engaging element can be estimated accurately.

In the heat load estimation device for the friction engaging element of the first aspect, a period from a start of a torque phase to a completion of the shifting in the transmission may be divided into a plurality of predetermined periods. The storage device may be configured to store a plurality of the mapping data each defining the different mapping in accordance with the period. The execution device may be configured to execute, as the change process, a process of selecting the mapping data in accordance with the period when the calculation process is executed.

According to the heat load estimation device for the friction engaging element of the first aspect, since each mapping data can be specialized for each predetermined period, the heat load of the friction engaging element can be estimated accurately.

In the heat load estimation device for the friction engaging element of the first aspect, a plurality of the periods may include at least one of a first period, a second period, a third period, and a fourth period. Here, the first period may be a period from the start of the torque phase to a closing of a pack clearance of the friction engaging element in the transmission. The second period may be a period from the closing of the pack clearance of the friction engaging element to a start of an inertia phase in the transmission. The third period may be a period from the start of the inertia phase until a differential value of a rotation speed of an input shaft of the transmission becomes equal to or smaller than a specified value. The fourth period may be a period after the differential value of the rotation speed of the input shaft becomes equal to or smaller than the specified value and until the rotation speed of the input shaft reaches a synchronous rotation speed after the shifting is completed.

The present inventors have confirmed that the heat generation state of the friction engaging element during the shifting differs in each of the first period, the second period, the third period, and the fourth period. Therefore, according to the heat load estimation device for the friction engaging element of the first aspect, by including at least one of the first to fourth periods as the above-mentioned plurality of periods, the heat load in the period can be estimated accurately.

In the heat load estimation device for the friction engaging element of the first aspect, the execution device may be configured to prohibit input of the input variable to the mapping from a start of supply of the hydraulic pressure to the friction engaging element to a start of a torque phase in the transmission as the change process, and the execution device may be configured to execute a process of inputting the input variable to the mapping after the start of the torque phase.

When the shifting is started, the supply of the hydraulic pressure to the friction engaging element is started. After that, however, until the torque phase is started in the transmission, sliding does not occur between the members of the friction engaging element that rotate relative to each other, so that heat generation of the friction engaging element is unlikely to occur. Therefore, according to the heat load estimation device for the friction engaging element of the first aspect, the input of the input variable to the mapping is prohibited during the period in which heat generation is unlikely to occur in the friction engaging element, that is, until the torque phase is started, whereas the input variable is input to the mapping after the start of the torque phase in which heat generation occurs in the friction engaging element. Therefore, when calculating the heat load, the period in which heat generation of the friction engaging element is unlikely to occur is excluded, so that the heat load of the friction engaging element can be estimated accurately.

In the heat load estimation device for the friction engaging element of the first aspect, the input variable may include an oil temperature variable that is a variable indicating a temperature of a hydraulic oil supplied to the friction engaging element. When the temperature of the hydraulic oil changes, the atmospheric temperature of the friction engaging element changes, so that the heat generation amount of the friction engaging element changes.

According to the heat load estimation device for the friction engaging element of the first aspect, since the oil temperature variable is included in the input variable, the heat load is calculated in consideration of the influence of the temperature of the hydraulic oil on the heat generation amount. Therefore, the heat load can be calculated with higher accuracy as compared with the case where the oil temperature variable is not included in the input variable.

In the heat load estimation device for the friction engaging element of the first aspect, the hydraulic pressure supplied to the friction engaging element may be changed such that the higher an output torque of a prime mover of the vehicle, the higher the hydraulic pressure, and the input variable may include a torque variable that is a variable that indicates the output torque.

According to the heat load estimation device for the friction engaging element of the first aspect, when the output torque of the prime mover is large, for example, in a situation where sudden acceleration is required, an increase in the hydraulic pressure shortens the time required for the friction engaging element to change from the released state to the engaged state, which shortens the time required for the shifting and enables quick shifting. Here, when the hydraulic pressure is variably set in accordance with the output torque, the magnitude of the output torque is related to the heat generation amount of the friction engaging element. In this respect, in the same configuration, since the torque variable is included in the input variable, the heat load is calculated in consideration of the influence of the output torque on the heat generation amount. Therefore, the heat load can be calculated with higher accuracy as compared with the case where the torque variable is not included in the input variable.

In the heat load estimation device for the friction engaging element of the first aspect, the transmission may include a plurality of the friction engaging elements, and the input variable may include a shifting variable indicating the friction engaging elements that are engaged at the time of the shifting.

According to the heat load estimation device for the friction engaging element of the first aspect, since the input variable includes the shifting variable, the heat load of the friction engaging elements that are engaged during the shifting can be calculated accurately.

A second aspect of the present disclosure relates to a heat load estimation method for a friction engaging element that is applied to a vehicle provided with a transmission including the friction engaging element that operates with hydraulic pressure, and that estimates a heat load when at least one of a temperature, a heat generation amount, and presence or absence of seizure in the friction engaging element at a time of shifting of the transmission is regarded as the heat load. The above heat load estimation method includes: (i) storing mapping data defining mapping, the mapping including, as an input variable, a speed variable that is a variable indicating a relative rotation speed of members of the friction engaging element that rotate relative to each other during the shifting of the transmission and a hydraulic pressure variable that is a variable indicating the hydraulic pressure supplied to the friction engaging element during the shifting of the transmission, and including, as an output variable, the heat load; (ii) executing a calculation process for calculating a value of the output variable by acquiring a value of the input variable and inputting the value to the mapping; and (iii) executing a change process for changing a mode of the calculation process during the shifting of the transmission.

According to the heat load estimation method for the friction engaging element of the second aspect, the speed variable indicating the relative rotation speed related to the amount of heat generated in the friction engaging element during the shifting and the hydraulic pressure variable indicating the above hydraulic pressure are used as input variables, and these input variables are input to the mapping defined by the mapping data to calculate the heat load described above. Since the state of the friction engaging element changes from the released state to the engaged state during the shifting, the heat generation state of the friction engaging element during the shifting changes in various ways. Thus, the execution mode of the calculation process for calculating the heat load is changed during the shifting. Therefore, the heat load of the friction engaging element can be estimated accurately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
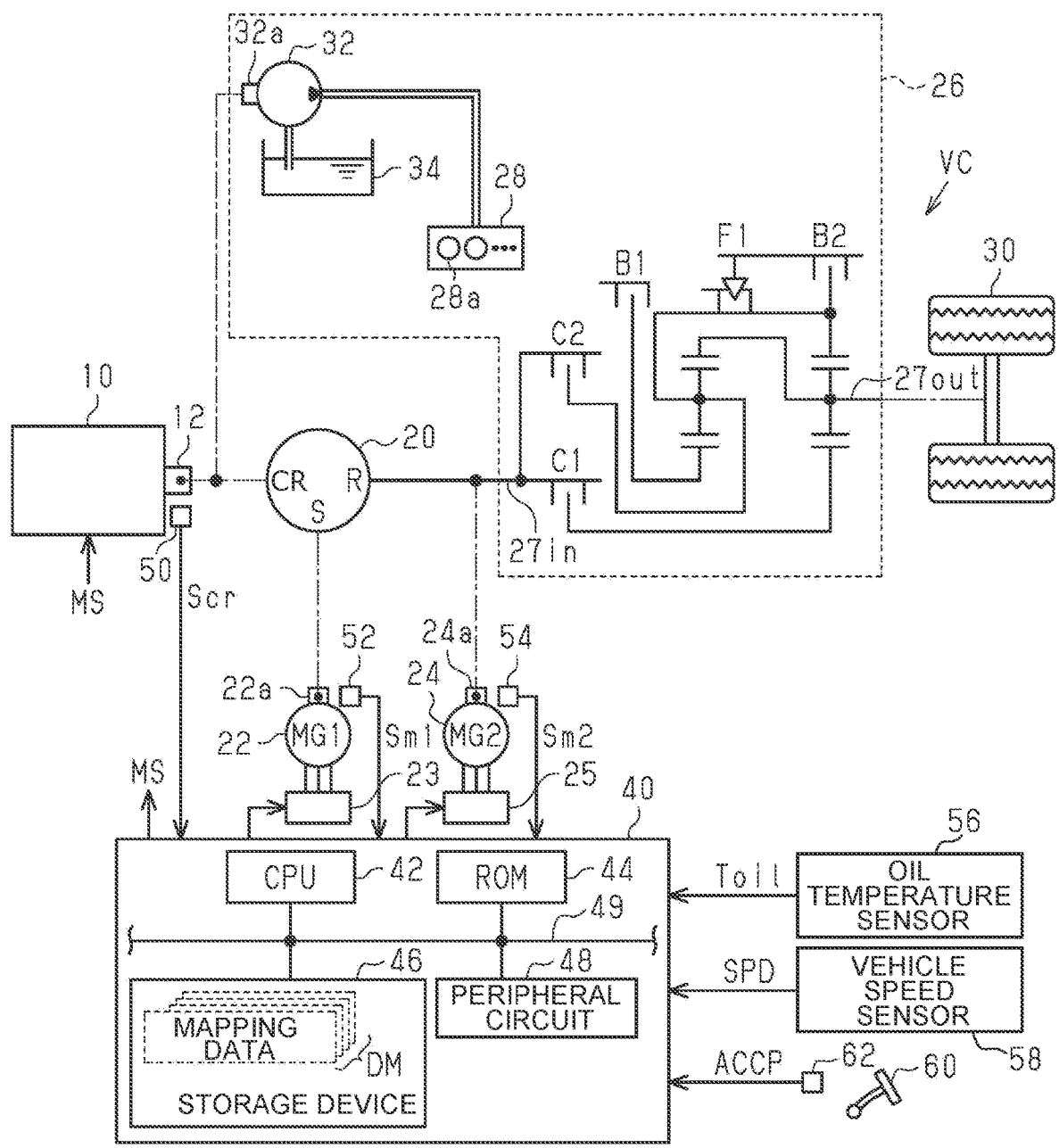
FIG. 1 is a diagram showing a configuration of a heat load estimation device for a friction engaging element according to an embodiment as an example of the present disclosure.

Hereinafter, embodiments related to a heat load estimation device and a heat load estimation method for a friction engaging element will be described with reference to FIGS. 1 to 5. As shown in FIG. 1, a power split device 20 is mechanically connected to a crankshaft 12 of an internal combustion engine 10 included in a vehicle VC. The power split device 20 divides the power of the internal combustion engine 10, a first motor generator 22, and a second motor generator 24. The power split device 20 includes a planetary gear mechanism. The crankshaft 12 is mechanically connected to a carrier CR of the planetary gear mechanism, a rotation shaft 22a of the first motor generator 22 is mechanically connected to a sun gear S, and a rotation shaft 24a of the second motor generator 24 and an input shaft 27in of an automatic transmission 26 are mechanically connected to a ring gear R. The output voltage of a first inverter 23 is applied to the terminal of the first motor generator 22. The output voltage of a second inverter 25 is applied to the terminal of the second motor generator 24.

The automatic transmission 26 is a multi-stage transmission equipped with a plurality of hydraulically operated frictional engaging elements such as a first clutch C1, a second clutch C2, a first brake B1, and a second brake B2, a plurality of planetary gear mechanisms, and a one-way clutch F1. In the automatic transmission 26, the shifting stage can be switched by the combination of the engaged state and the released state of the first clutch C1, the second clutch C2, the first brake B1, and the second brake B2, and the combination of the rotation restricted state and the rotation allowable state switched by the one-way clutch F1. The automatic transmission 26 of the present embodiment is a transmission including four forward speeds and one reverse speed, however, the number of such gears can be changed as appropriate.

The basic structure of the friction engaging element is almost the same and is a well-known structure. That is, in the friction engaging element, a first plate and a second plate that rotate relative to each other are alternately arranged, and a friction material is attached to one of the plates. When no hydraulic pressure is supplied to the friction engaging element, the first plate and the second plate are separated from each other, and torque transmission between the first plate and the second plate is cut off.

On the other hand, when hydraulic pressure is supplied to the friction engaging element, the pack clearance PCtc, which is the clearance between the first plate and the second plate, is closed, which brings the friction engaging element into the state immediately before the start of engagement, that is, a packed state. When further hydraulic pressure is supplied after this packing is completed, the first plate and the second plate start to engage with each other, so that the relative rotation speed of the first plate and the second plate gradually decreases and the torque capacity of the friction engaging element increases. Finally, when the relative rotation speed between the first plate and the second plate becomes "zero", the friction engaging element is in a completely engaged state.

Drive wheels 30 are mechanically connected to an output shaft 27out of the automatic transmission 26. Further, a driven shaft 32a of an oil pump 32 is mechanically connected to the carrier CR. The oil pump 32 is a pump that circulates the oil in an oil pan 34 as lubricating oil to the power split device 20 and supplies the oil to the automatic transmission 26 as hydraulic oil. The pressure of the hydraulic oil discharged from the oil pump 32 is adjusted by a hydraulic pressure control circuit 28 in the automatic transmission 26, and the hydraulic oil is used as, for example, hydraulic oil for supplying hydraulic pressure to the friction engaging element. The hydraulic pressure control circuit 28 includes a plurality of solenoid valves 28a, and is a circuit that controls the flow state of the hydraulic oil and the hydraulic pressure of the hydraulic oil by energizing each of the solenoid valves 28a.

A control device 40 controls the internal combustion engine 10 and operates various operation units of the internal combustion engine 10 in order to control torque, an exhaust component ratio, and the like, which are control amounts thereof. Further, the control device 40 controls the first motor generator 22 and operates the first inverter 23 in order to control torque, rotation speed, and the like, which are control amounts thereof. Further, the control device 40 controls the second motor generator 24 and operates the second inverter 25 in order to control torque, rotation speed, and the like, which are control amounts thereof.

When the control device 40 controls the above control amounts, the control device 40 references the output signal Scr of a crank angle sensor 50, the output signal Sm1 of a first rotation angle sensor 52 that detects the rotation angle of the rotation shaft 22a of the first motor generator 22, and the output signal Sm2 of a second rotation angle sensor 54 that detects the rotation angle of the rotation shaft 24a of the second motor generator 24. Further, the control device 40 references the oil temperature Toil that is the temperature of the hydraulic oil detected by an oil temperature sensor 56, the vehicle speed SPD detected by a vehicle speed sensor 58, and the accelerator operation amount ACCP that is a depression amount of an accelerator pedal 60 detected by an accelerator sensor 62.

The control device 40 includes a central processing unit (CPU) 42, a read only memory (ROM) 44, a storage device 46 that is an electrically rewritable non-volatile memory, and a peripheral circuit 48, which can communicate with each other via a local network 49. Here, the peripheral circuit 48 includes a circuit that generates a clock signal that defines the internal operation, a power supply circuit, a reset circuit, and the like. The control device 40 controls the control amounts when the CPU 42 executes the program stored in the ROM 44. The CPU 42 and the ROM 44 constitute an execution device.

Figure 2:
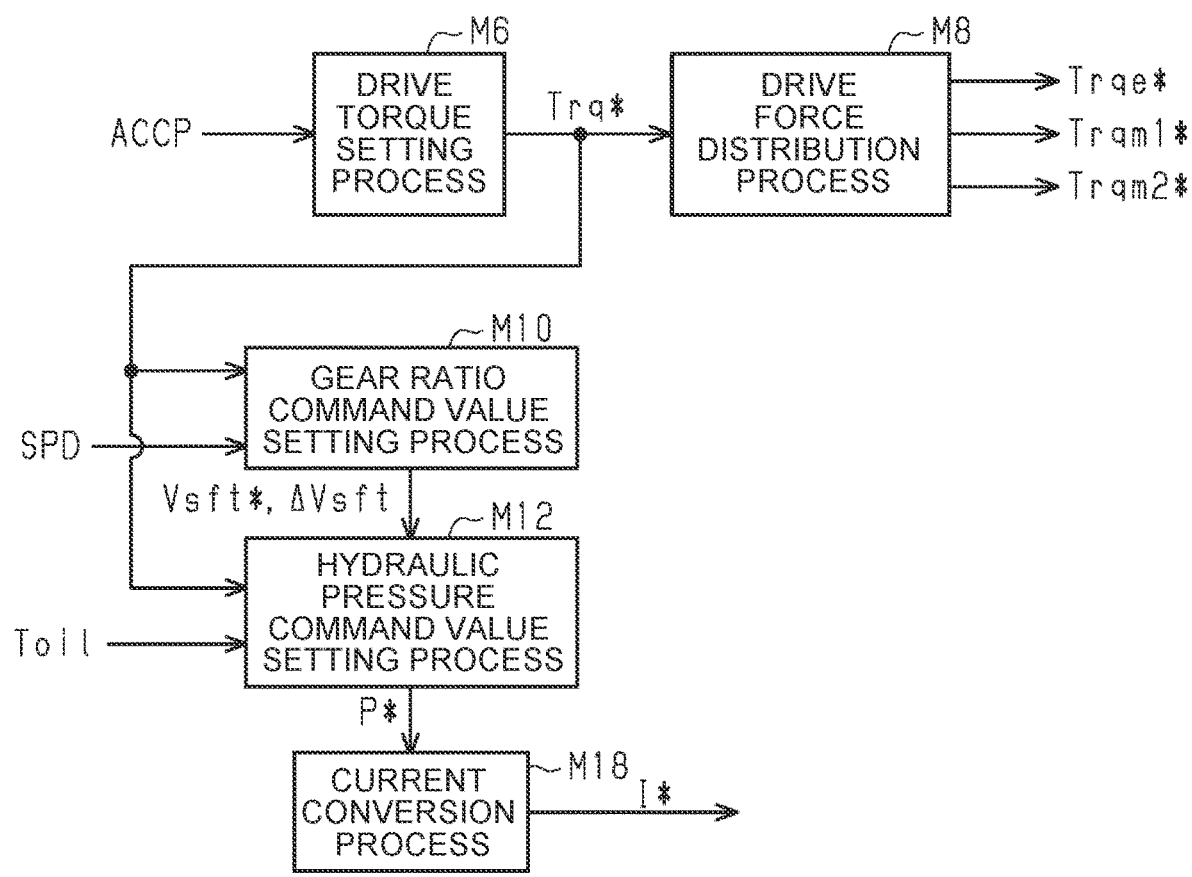
FIG. 2 is a block diagram showing a process executed by a control device according to the embodiment.

FIG. 2 shows a process executed by the control device 40. The process shown in FIG. 2 is realized when the CPU 42 repeatedly executes the program stored in the ROM 44, for example, at a predetermined cycle.

The drive torque setting process M6 is a process of receiving the accelerator operation amount ACCP as an input and calculating the drive torque command value Trq*, which is a command value of the torque to be applied to the drive wheels 30, to a larger value when the accelerator operation amount ACCP is large as compared to when the accelerator operation amount ACCP is small.

The drive force distribution process M8 is a process of setting, based on the drive torque command value Trq*, the torque command value Trqe* for the internal combustion engine 10, the torque command value Trqm1* for the first motor generator 22, and the torque command value Trqm2* for the second motor generator 24. The torque corresponding to these torque command values Trqe*, Trqm1*, and Trqm2* is generated by the internal combustion engine 10, the first motor generator 22, and the second motor generator 24, respectively, so that the torque applied to the drive wheels 30 is the value corresponding to the drive torque command value Trq*.

In the gear ratio command value setting process M10, the gear ratio command value Vsft*, which is the command value of the gear ratio of the automatic transmission 26, and a switching variable ΔVsft indicating whether the gear ratio is upshifted or downshifted are set based on the drive torque command value Trq* and the vehicle speed SPD. Therefore, for example, when the gear ratio command value Vsft* indicates third gear and the switching variable ΔVsft indicates the upshifting, it indicates that the type of shifting is switching from third gear to fourth gear. The gear ratio command value Vsft* and the switching variable ΔVsft are shifting variables indicating the friction engaging element that is engaged during shifting.

The hydraulic pressure command value setting process M12 calculates the oil pressure command value P0*, which is the base value of the command value of the hydraulic pressure adjusted by the solenoid valves used for switching, based on the drive torque command value Trq*, the oil temperature Toil, and the gear ratio command value Vsft* and the switching variable ΔVsft when the gear ratio is switched. This hydraulic pressure command value setting process M12 is realized when the CPU 42 performs a map calculation of the hydraulic command value P0* in a state where the map data in which the drive torque command value Trq*, the gear ratio command value Vsft*, the switching variable ΔVsft, and the oil temperature Toil are input variables, and the oil pressure command value P0* is an output variable is stored in the ROM 44 in advance. When the drive torque command value Trq* is large, for example, in a situation where sudden acceleration is required, the time required for the friction engaging element to change from the released state to the engaged state is shortened by increasing the hydraulic pressure, which shortens the time required for the shifting and enables quick shifting. Therefore, when the drive torque command value Trq* is large, the calculated hydraulic pressure command value P0* is set to a higher pressure than when the drive torque command value Trq* is small. Further, the hydraulic pressure command value setting process M12 calculates the final hydraulic pressure command value P* by correcting the hydraulic pressure command value P0* with various values.

The current conversion process M18 is a process of converting the hydraulic pressure command value P* into the current command value I*, which is the command value of the current flowing through the solenoid valves 28a. When the value of the gear ratio command value Vsft* changes, the control device 40 changes the current command value I* of the solenoid valves 28a corresponding to the friction engaging element whose engagement is started in accordance with the gear ratio command value Vsft* and the switching variable ΔVsft, so that the friction engaging element is switched from the released state to the engaged state.

Figure 3A:
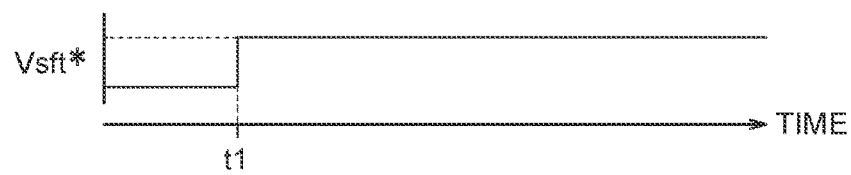
FIG. 3A is a time chart showing a change in a gear ratio command value at the time of shifting of the embodiment.
Figure 3B:
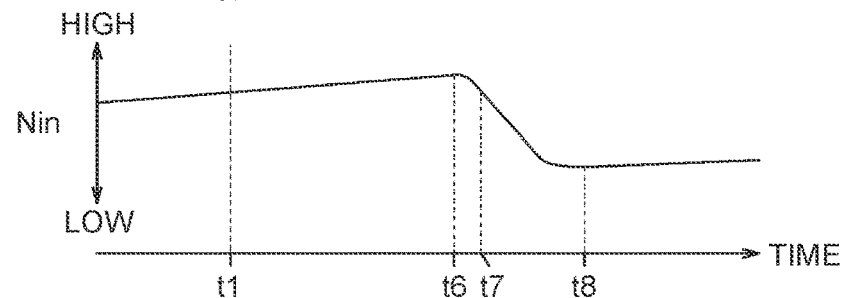
FIG. 3B is a time chart showing a change in the input shaft rotation speed at the time of shifting.
Figure 3C:
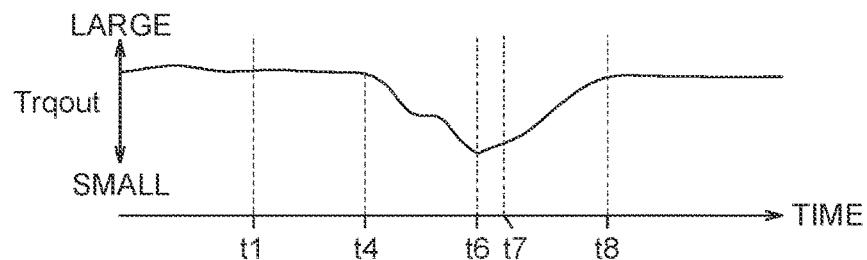
FIG. 3C is a time chart showing a change in output torque at the time of shifting.
Figure 3D:
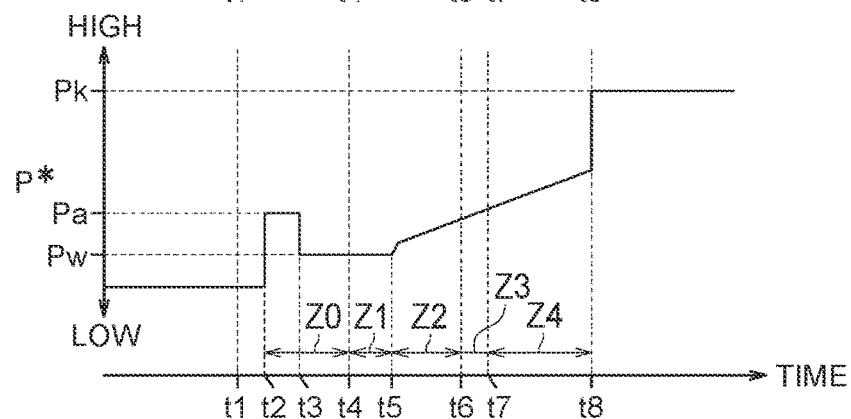
FIG. 3D is a time chart showing a change in a hydraulic pressure command value at the time of shifting.
Figure 3E:
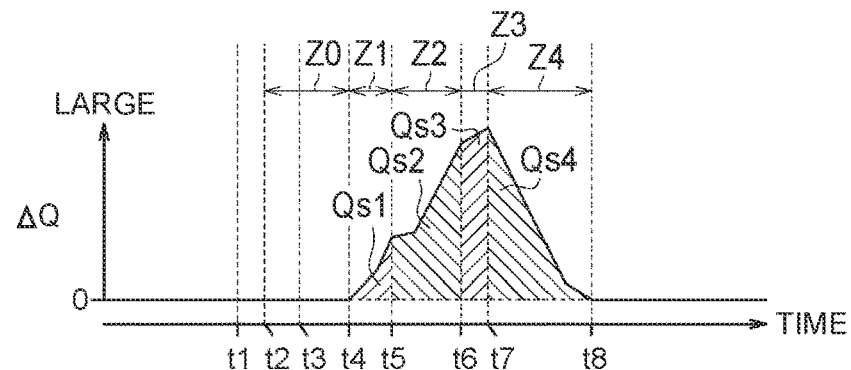
FIG. 3E is a time chart showing a change in a unit heat generation amount at the time of shifting.
Figure 3F:
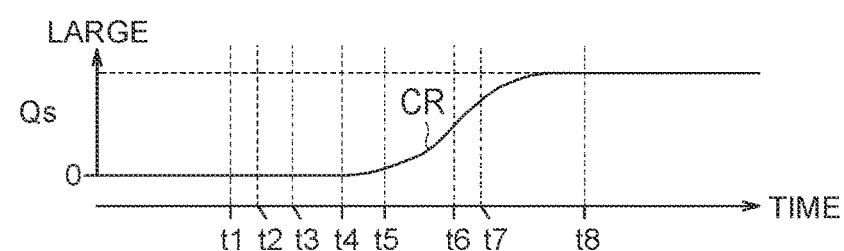
FIG. 3F is a time chart showing a change in the total heat generation amount at the time of shifting.

FIGS. 3A to 3F show changes in various values at the time of shifting. FIG. 3A is a time chart indicating a change in the gear ratio command value Vsft*, FIG. 3B is a time chart indicating a change in the input shaft rotation speed Nin, FIG. 3C is a time chart indicating a change in the output torque Trqout, FIG. 3D is a time chart indicating a change in the hydraulic pressure command value P*, FIG. 3E is a time chart indicating a change in the unit heat generation amount ΔQ, which is the amount of heat generated per unit time, and FIG. 3F is a time chart indicating a change in the total heat generation amount Qs, which is a value obtained by integrating the unit heat generation amount ΔQ.

As shown in FIGS. 3A and 3D, when the value of the gear ratio command value Vsft* changes at time t1, the hydraulic pressure command value P*, which is an instruction value of the hydraulic pressure supplied to the friction engaging element to be engaged in the current shifting, is output at time t2.

As the hydraulic pressure command value P*, the apply pressure Pa for executing the quick apply control is first set, so that the hydraulic pressure command value P* is once increased and the supply of the hydraulic pressure to the friction engaging element is started (time t2). This quick apply control is a well-known control for temporarily increasing the hydraulic pressure in order to quickly supply hydraulic oil to the friction engaging element when the friction engaging element in the released state is transferred to the engaged state. Then, after the hydraulic pressure command value P* is set to the apply pressure Pa for the specified time, the hydraulic pressure command value P* is lowered to the specified standby pressure Pw (time t3). This standby pressure Pw is the hydraulic pressure required for performing the packing described above.

Then, when the specified time has elapsed since the start of the supply of the hydraulic pressure at time t2 and the time for determining that the packing is completed has elapsed (time t5), sweep control that gradually increases the hydraulic pressure command value P* from the standby pressure Pw is executed. During the execution of this sweep control, the input shaft rotation speed Nin starts to change toward the synchronous rotation speed after the shifting due to the start of the inertia phase (time t6).

Then, at time t8, when the input shaft rotation speed Nin reaches the synchronous rotation speed after the shifting, the hydraulic pressure command value P* is suddenly increased to the engagement pressure Pk, which is the pressure required to suppress slipping of the friction engaging element, thereby the shifting is completed.

The torque phase is started at time t4, which is the time between the start of the supply of the hydraulic pressure at time t2 and the completion of the packing at time t5, so that the output torque Trqout transmitted to the output shaft 27out of the automatic transmission 26 starts to decrease. Then, when the inertia phase is started at time t6, the output torque Trqout starts to increase.

Since the state of the friction engaging element changes from the released state to the engaged state during the shifting, the heat generation state of the friction engaging element during the shifting changes in various ways. More specifically, as shown in FIGS. 3A to 3F, the period from the start of the supply of the hydraulic pressure to the friction engaging element to the start of the torque phase in the automatic transmission 26 (the period from time t2 to time t4) is regarded as the initial period Z0. In this initial period Z0, the shifting is started and the supply of the hydraulic pressure to the friction engaging element is started. However, in a period until the torque phase is started in the automatic transmission 26, sliding does not occur between the first plate and the second plate of the friction engaging element that rotate relative to each other, so heat generation of the friction engaging element is unlikely to occur.

The time from the start of the supply of the hydraulic pressure at time t2 to the start of the torque phase at time t4 correlates with the pack clearance PCtc of the friction engaging element and the like. Therefore, the pack clearance PCtc is measured at the time of shipment of the automatic transmission 26, and the measured value is stored in the storage device 46. Since the pack clearance PCtc increases as the number of times the friction engaging element is engaged increases, the value of the pack clearance PCtc is updated in consideration of such a change with time. Based on the value of the pack clearance PCtc updated in this way, the time TZ0 from the output of the hydraulic pressure command value P* to the start of the torque phase is calculated. Thus, when the elapsed time from the output of the hydraulic pressure command value P* is within the time TZ0, it can be determined to currently be in the initial period Z0.

Further, the period from the start of the torque phase in the automatic transmission 26 to the closing of the pack clearance of the friction engaging element (the period from time t4 to time t5) is regarded as the first period Z1. The time from the start of the supply of the hydraulic pressure at time t2 until the pack clearance is closed at time t5, that is, the time until the packing is completed also correlates with the pack clearance PCtc and the like. Therefore, based on the value of the pack clearance PCtc updated, the time TZ1 from the output of the hydraulic pressure command value P* to the closing of the pack clearance is calculated. Thus, when the elapsed time from the output of the hydraulic pressure command value P* is a time between the time TZ0 and the time TZ1, it can be determined to currently be in the first period Z1.

Further, the period from the closing of the pack clearance of the friction engaging element to the start of the inertia phase in the automatic transmission 26 (the period from time t5 to time t6) is regarded as the second period Z2. When the inertia phase starts, the input shaft rotation speed Nin changes significantly. Therefore, it can be determined to be currently in the second period Z2 while the elapsed time from the output of the hydraulic pressure command value P* exceeds the above time TZ1 and until the input shaft rotation speed Nin changes significantly. In the present embodiment, the rotation speed of the input shaft 27in is configured to be the same as the rotation speed of the second motor generator 24. Therefore, the CPU 42 calculates the input shaft rotation speed Nin based on the output signal Sm2.

Further, the period from the start of the inertia phase until the differential value of the input shaft rotation speed Nin of the automatic transmission 26 becomes equal to or smaller than the specified value a (the period from time t6 to time t7), that is, the period from the start of the inertia phase until the change in the input shaft rotation speed Nin of the automatic transmission 26 stabilizes, is regarded as the third period Z3. It can be determined to currently be in the third period Z3 after the second period Z2 has elapsed and until the differential value of the input shaft rotation speed Nin becomes equal to or smaller than the above specified value a.

Further, the period from when the differential value of the input shaft rotation speed Nin becomes equal to or smaller than the above specified value a until the input shaft rotation speed Nin reaches the synchronous rotation speed after the shifting is completed (the period from time t7 to time t8) is regarded as the fourth period Z4. From the time when the differential value of the input shaft rotation speed Nin is determined to be equal to or smaller than the above specified value a until the input shaft rotation speed Nin reaches the synchronous rotation speed after the shifting is completed, it can be determined to currently be in the fourth period Z4.

The present inventors have confirmed that the heat generation state of the friction engaging element is different for each period Z1, Z2, Z3, and Z4. Therefore, the control device 40 of the present embodiment estimates the heat load such as the temperature, the heat generation amount, and the presence or absence of seizure in the friction engaging element at the time of shifting, and changes the execution mode of the calculation process for calculating the heat load during the shifting. Such processing will be described below. The control device 40 that executes the following processes constitutes a heat load estimation device for the friction engaging element.

Figure 4:
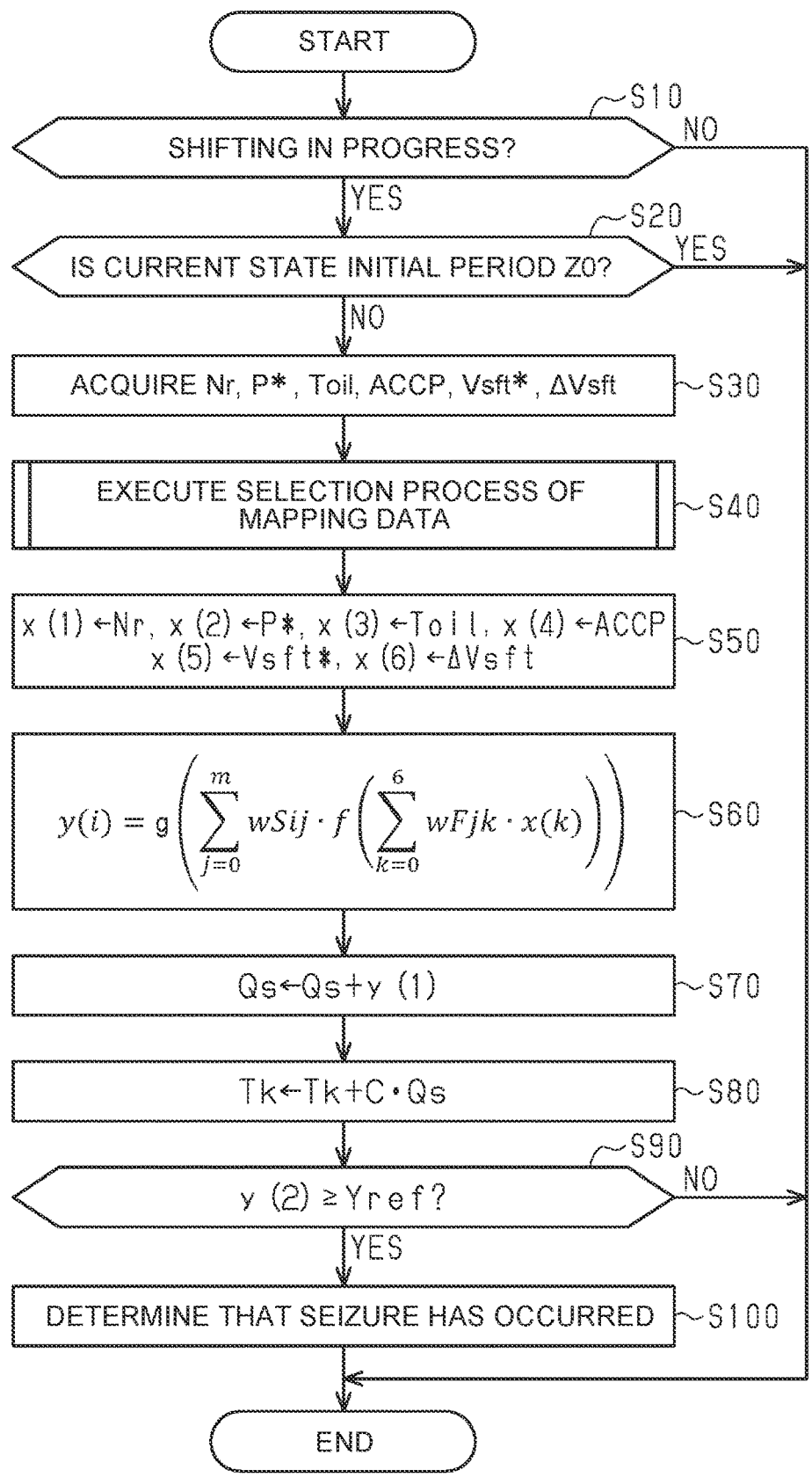
FIG. 4 is a flowchart showing a procedure of a process executed by the control device according to the embodiment.

FIG. 4 shows a procedure of a process executed by the control device 40 according to the present embodiment. The process shown in FIG. 4 is realized when the CPU 42 repeatedly executes the program stored in the ROM 44, for example, at a predetermined cycle. Note that, in the following, the step number of each process is represented by a number with "S" added at the beginning.

In the series of processes shown in FIG. 4, the CPU 42 first determines whether the shifting is in progress (S10). Then, when it is determined that the shifting is not in progress, the CPU 42 temporarily ends this process.

On the other hand, when it is determined that the shifting is in progress, the CPU 42 determines whether the current state is the initial period Z0 (S20). Then, when it is determined that the current state is the initial period Z0 (S20: YES), the CPU 42 temporarily ends this process.

On the other hand, when it is determined that the current state is not the initial period Z0 (S20: NO), the CPU 42 executes an acquisition process for acquiring various values (S30). Specifically, the relative rotation speed Nr, the hydraulic pressure command value P*, the oil temperature Toil, the accelerator operation amount ACCP, the gear ratio command value Vsft*, and the switching variable ΔVsft are acquired.

The relative rotation speed Nr is the relative rotation speed of the first plate and the second plate of the friction engaging element that rotate relative to each other during the shifting of the automatic transmission 26, and is the difference between the input shaft rotation speed Nin and the "output shaft rotation speed Nout×gear ratio after shifting". The CPU 42 calculates the output shaft rotation speed Nout based on the vehicle speed SPD. Further, the gear ratio command value Vsft* is substituted as the "gear ratio after shifting".

Next, the CPU 42 executes a selection process for selecting one of the four types of mapping data DM stored in the storage device 46 (S40).

Figure 5:
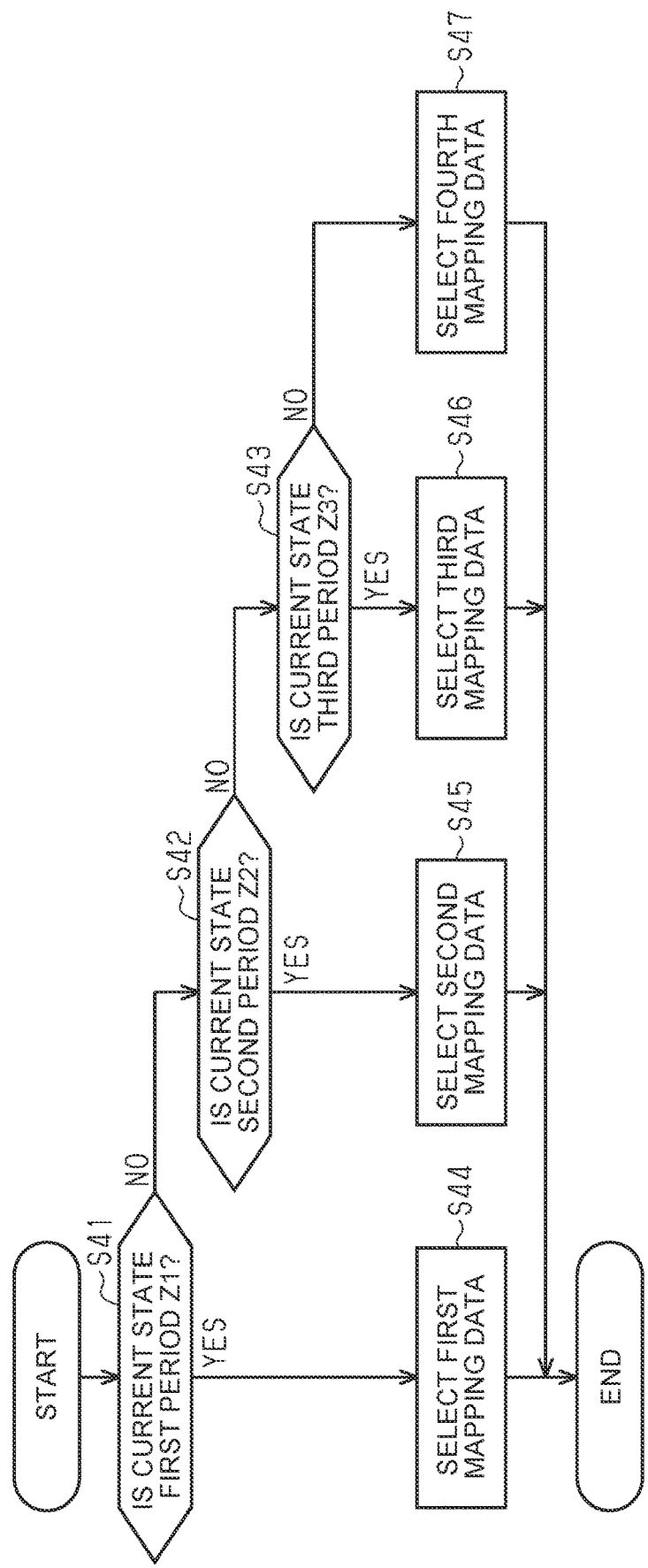
FIG. 5 is a flowchart showing a procedure of a process executed by the control device according to the embodiment.

FIG. 5 shows the procedure of the selection process.

When this selection process is started, the CPU 42 determines whether the current state is the first period Z1 (S41). Then, when it is determined that the current state is the first period Z1 (S41: YES), the CPU 42 selects the first mapping data (S44) and temporarily ends this process. The first mapping data is mapping data for estimating the heat generation amount and the presence or absence of seizure in the friction engaging element in the first period Z1, and is a trained model trained using the data in the first period Z1 as training data.

When it is determined in the process of S41 that the current state is not the first period Z1 (S41: NO), the CPU 42 determines whether the current state is the second period Z2 (S42). Then, when it is determined that the current state is the second period Z2 (S42: YES), the CPU 42 selects the second mapping data (S45) and temporarily ends this process. The second mapping data is mapping data for estimating the heat generation amount and the presence or absence of seizure in the friction engaging element in the second period Z2, and is a trained model trained using the data in the second period Z2 as training data.

When it is determined in the process of S42 that the current state is not the second period Z2 (S42: NO), the CPU 42 determines whether the current state is the third period Z3 (S43). Then, when it is determined that the current state is the third period Z3 (S43: YES), the CPU 42 selects the third mapping data (S46) and temporarily ends this process. The third mapping data is mapping data for estimating the heat generation amount and the presence or absence of seizure in the friction engaging element in the third period Z3, and is a trained model trained using the data in the third period Z3 as training data.

When it is determined in the process of S42 that the current state is not the third period Z3 (S43: NO), the CPU 42 selects the fourth mapping data (S47) and temporarily ends this process. The fourth mapping data is mapping data for estimating the heat generation amount and the presence or absence of seizure in the friction engaging element in the fourth period Z4, and is a trained model trained using the data in the fourth period Z4 as training data.

When the mapping data DM is selected in this way, the CPU 42 then substitutes each value acquired in the process of S30 into the input variables for the mapping defined by the selected mapping data DM (S50).

That is, the CPU 42 substitutes the relative rotation speed Nr into the input variable x(1), substitutes the hydraulic pressure command value P* into the input variable x(2), substitutes the oil temperature Toil into the input variable x(3), substitutes the accelerator operation amount ACCP into the input variable x(4), substitutes the gear ratio command value Vsft* into the input variable x(5), and substitutes the switching variable ΔVsft into the input variable x(6).

In the present embodiment, the input variable x(1) is a speed variable indicating the relative rotation speed Nr. The input variable x(2) is a hydraulic pressure variable indicating the hydraulic pressure supplied to the friction engaging element during the shifting of the automatic transmission 26. The input variable x(3) is an oil temperature variable indicating the temperature of the hydraulic oil supplied to the friction engaging element. The input variable x(4) is a torque variable indicating the output torque of the in-vehicle prime mover. Since the accelerator operation amount ACCP is a value related to the output torque of the in-vehicle prime mover, in the present embodiment, the accelerator operation amount ACCP is adopted as a torque variable, but the drive torque command value Trq* may be adopted as this torque variable. The input variable x(5) and the input variable x(6) are shifting variables indicating the friction engaging element that is engaged during the shifting.

Next, the CPU 42 substitutes the input variables x(1), x(2), x(3), x(4), x(5), and x(6) into the mapping to execute the calculation process for calculating the value of the output variable y(i) (S60).

In the present embodiment, a function approximator is exemplified as the mapping, and more specifically, a fully connected forward propagation type neural network including one intermediate layer is exemplified. Specifically, the values of the nodes in the intermediate layer are determined by substituting each of "m" values into the activation function f. The "m" values are values which are acquired by converting the input variables x(1) to x(6) substituted in the process of S50 and the input variable x(0) serving as a bias parameter by the linear mapping defined by the coefficient wFjk (j=1 to m, k=0 to 6). Further, the values of the output variables y(1) and y(2) are determined by substituting the values obtained by converting each of the values of the nodes in the intermediate layer into the activation function g based on the linear mapping defined by the coefficient wSij (i=1, 2). In the present embodiment, a hyperbolic tangent is exemplified as the activation function f. Further, in the activation function g, the ReLU function is exemplified for the portion corresponding to the output variable y(1), and the softmax function is exemplified for the portion corresponding to the output variable y(2).

The output variable y(1) and the output variable y(2) are variables indicating the heat load of the friction engaging element, and the output variable y(1) indicates the unit heat generation amount ΔQ. Further, the output variable y(2) indicates a determination value for determining the presence or absence of seizure in the friction engaging element.

Next, the CPU 42 updates the total heat generation amount Qs by adding the unit heat generation amount ΔQ indicated by the output variable y(1) to the currently calculated total heat generation amount Qs (S70). Next, the CPU 42 calculates the rising temperature of the friction engaging element by multiplying the total heat generation amount Qs updated in S70 by the heat capacity C of the friction engaging element, which is the target of this calculation. At the same time, the CPU 42 adds the calculated rising temperature to the currently calculated temperature Tk of the friction engaging element to update the temperature Tk of the friction engaging element (S80). The heat capacity C is a predetermined value obtained in advance. Further, the initial value of the temperature Tk of the friction engaging element may be, for example, the oil temperature Toil.

Next, the CPU 42 determines whether the determination value indicated by the output variable y(2) is equal to or larger than the specified threshold value Yref (S90). As the threshold value Yref, a value that can appropriately determine that seizure has occurred in the friction engaging element when the value of the output variable y(2) is equal to or larger than the threshold value Yref is set in advance.

Then, when it is determined that the determination value indicated by the output variable y(2) is smaller than the threshold value Yref (S90: NO), the CPU 42 temporarily ends this process. On the other hand, when it is determined that the determination value indicated by the output variable y(2) is equal to or larger than the threshold value Yref (S90: YES), the CPU 42 determines that seizure has occurred on the friction engaging element that was engaged in the current shifting (S100), and temporarily ends this process.

Next, operations and effects of the present embodiment will be described.

(1) The higher the relative rotation speed Nr between the first plate and the second plate of the friction engaging element that rotate relative to each other, the larger the heat generation amount of the friction engaging element. Further, the higher the hydraulic pressure supplied to the friction engaging element during the shifting, the larger the heat generation amount of the friction engaging element. Therefore, in the present embodiment, the speed variable indicating the relative rotation speed Nr related to the amount of heat generated in the friction engaging element during the shifting and the hydraulic pressure variable indicated by the hydraulic pressure command value P* are used as input variables, and these input variables are input to the mapping defined by the mapping data to calculate the heat load such as the heat generation amount, the temperature, or the presence or absence of seizure in the friction engaging element. Since the state of the friction engaging element changes from the released state to the engaged state during the shifting, the heat generation state of the friction engaging element during the shifting changes in various ways. Therefore, in the present embodiment, the change process for changing, during the shifting, the execution mode of the calculation process for calculating the heat load is executed.

More specifically, the present inventors have confirmed that the heat generation state of the friction engaging element during the shifting differs in each of the first period Z1, the second period Z2, the third period Z3, and the fourth period Z4.

Therefore, the period from the start of the torque phase to the completion of the shifting in the automatic transmission 26 (the period from time t4 to time t8 shown in FIGS. 3A to 3F) is divided into a plurality of predetermined periods, that is, the first period Z1, the second period Z2, the third period Z3, and the fourth period Z4 described above. The storage device 46 stores a plurality of mapping data each defining a different mapping in accordance with each period, that is, the first mapping data, the second mapping data, the third mapping data, and the fourth mapping data. As the change process, the CPU 42 executes a process of selecting mapping data in accordance with each of the above periods when executing the calculation process. Therefore, since each mapping data can be specialized for each predetermined period, the heat load of the friction engaging element can be estimated accurately.

As described above, since the heat generation state of the friction engaging element changes variously during the shifting, the structure of the mapping tends to be complicated when the heat load is calculated with a single mapping throughout the entire period during the shifting. However, in the present embodiment, since the mapping data can be specialized for each of the above-mentioned predetermined periods, the structure of the mapping can be easily simplified.

(2) When the shifting is started, the supply of the hydraulic pressure to the friction engaging element is started. After that, however, until the torque phase is started in the automatic transmission 26, sliding does not occur between the first plate and the second plate of the friction engaging element that rotate relative to each other, so that heat generation of the friction engaging element is unlikely to occur.

Therefore, the CPU 42 executes the following process as a change process different from the above change process. That is, in the initial period Z0, which is the period from the start of the supply of the hydraulic pressure to the friction engaging element to the start of the torque phase in the automatic transmission 26, when a positive determination is made in S20 shown in FIG. 4, the process in S30 and thereafter shown in FIG. 4 is not executed. That is, the input of input variables to the mapping is prohibited. On the other hand, when the shifting is in progress (S10: YES in FIG. 4) and it is determined that the current state is not the initial period Z0 (S20: NO in FIG. 4), the process in S30 and thereafter shown in FIG. 4 is executed to execute the process of inputting the input variables to the mapping. That is, the process of inputting the input variables to the mapping is executed after the torque phase is started. Thus, in the present embodiment, the input of the input variables to the mapping is prohibited during the period in which heat generation is unlikely to occur in the friction engaging element, that is, until the torque phase is started, whereas the input variables are input to the mapping after the start of the torque phase in which heat generation occurs in the friction engaging element. Therefore, when calculating the heat load, the period in which heat generation of the friction engaging element is unlikely to occur is excluded, so that the heat load of the friction engaging element can be estimated accurately.

(3) When the temperature of the hydraulic oil changes, the atmospheric temperature of the friction engaging element changes, so that the heat generation amount of the friction engaging element changes. In this regard, in the present embodiment, since the oil temperature Toil as an oil temperature variable indicating the temperature of the hydraulic oil is included in the input variables, the heat load is calculated in consideration of the influence of the temperature of the hydraulic oil on the heat generation amount. Therefore, the heat load can be calculated with higher accuracy as compared with the case where the oil temperature variable is not included in the input variables.

(4) In the present embodiment, the hydraulic pressure command value P* is variably set in accordance with the output torque of the in-vehicle prime mover. When the hydraulic pressure is variably set in accordance with the output torque, the magnitude of the output torque is related to the heat generation amount of the friction engaging element. In this regard, in the present embodiment, since the above input variables include the accelerator operation amount ACCP as a torque variable indicating the output torque of the in-vehicle prime mover, the heat load is calculated in consideration of the influence of the output torque on the heat generation amount. Therefore, the heat load can be calculated with higher accuracy as compared with the case where the torque variable is not included in the input variables.

(5) Since the input variables include the gear ratio command value Vsft* and the switching variable ΔVsft as the shifting variables indicating the friction engaging element that is engaged during the shifting, the heat load of the friction engaging element that is engaged during the shifting can be calculated accurately.

The present embodiment can be modified to be implemented as follows. The present embodiment and modifications described below may be carried out in combination within a technically consistent range.

As shown by the hatched areas in FIG. 3E, the total heat generation amount Qs1 in the first period Z1, the total heat generation amount Qs2 in the second period Z2, the total heat generation amount Qs3 in the third period Z3, and the total heat generation amount Qs4 in the fourth period Z4 may be calculated as output variables. In this case, as the values of the input variables x(1), x(2), x(3), and x(4), the average value, the maximum value in each period, or a set of the value immediately after the start of the section and the value immediately after the end of the section may be adopted.

A value imitating the curve CR of the total heat generation amount Qs shown in FIG. 3F may be used as an output variable.

At least one of the first period Z1, the second period Z2, the third period Z3, and the fourth period Z4 may be set, and mapping data corresponding to the set period may be prepared. Even in this case, the heat load of the friction engaging element in the set period can be estimated accurately.

Any one of the output variable y(1) and the output variable y(2) may be omitted, and the calculation of the temperature Tk may be omitted.

The vehicle VC is equipped with a communication device. The vehicle VC and the external data analysis center can communicate with each other via the communication device and the external network. The data analysis center includes a CPU, a ROM, a storage device, and a communication device. The CPU of the data analysis center may execute the selection process and the calculation process described above. In this case, the calculation load of the CPU 42 of the vehicle VC can be reduced as compared with the case where the CPU 42 of the vehicle VC executes the selection process and the calculation process described above.

Of the input variables, at least one of the oil temperature variable, the torque variable, and the shifting variable may be omitted. Further, other variables related to the heat load may be added to the input variables.

The activation function of the above mapping is an example, and other functions may be adopted.

As the neural network, a neural network including one intermediate layer is exemplified, but the number of intermediate layers may be two or more.

As the neural network, a fully connected forward propagation type neural network is exemplified, but the neural network is not limited to this. For example, as the neural network, a recurrent neural network may be adopted.

The function approximator as the mapping may be a regression equation. This corresponds to the above neural network having no intermediate layer.

The execution device is not limited to an execution device that includes the CPU 42 and the ROM 44 and executes software processing. For example, the execution device may include a dedicated hardware circuit (for example, an application specific integrated circuit (ASIC), etc.) that executes hardware processes in place of at least part of the software processes executed in the above embodiment. That is, the execution device only needs to have any of the following configurations (a) to (c). (a) A configuration including a processing device that executes all of the above processes according to a program and a program storage device such as a ROM for storing the program. (b) A configuration including a processing device that executes part of the above processes according to a program, a program storage device, and a dedicated hardware circuit that executes the remaining processes. (c) A configuration including a dedicated hardware circuit that executes all of the above processes. Here, the above configurations may include a plurality of software execution devices including a processing device and a program storage device and a plurality of dedicated hardware circuits.

The vehicle VC is not limited to series/parallel hybrid vehicles. For example, the vehicle VC may be a series hybrid vehicle or a parallel hybrid vehicle. The vehicle VC is not limited to a vehicle that includes an internal combustion engine and a motor generator as an in-vehicle prime mover. For example, a vehicle having an internal combustion engine but not having a motor generator may be used, or a vehicle having a motor generator but not having an internal combustion engine may be used.

What is claimed is:

1. A heat load estimation device for a friction engaging element that is applied to a vehicle provided with a transmission including the friction engaging element that operates with hydraulic pressure, and that is configured to estimate a heat load when at least one of a temperature, a heat generation amount, and presence or absence of seizure in the friction engaging element at a time of shifting of the transmission is regarded as the heat load, the heat load estimation device comprising:

a storage device comprising a memory and configured to store mapping data defining mapping, the mapping including, as an input variable, a speed variable that is a variable indicating a relative rotation speed of members of the friction engaging element that rotate relative to each other during the shifting of the transmission and a hydraulic pressure variable that is a variable indicating the hydraulic pressure supplied to the friction engaging element during the shifting of the transmission, and including, as an output variable, the heat load; and a processor programmed to function as an execution device configured to execute a calculation process for calculating a value of the output variable by acquiring a value of the input variable and inputting the value to the mapping, and a change process for changing an execution mode of the calculation process during the shifting of the transmission, wherein:

the execution device is configured to prohibit input of the input variable to the mapping from a start of supply of the hydraulic pressure to the friction engaging element to a start of a torque phase in the transmission as the change process; and the execution device is configured to execute a process of inputting the input variable to the mapping after the start of the torque phase.

2. The heat load estimation device according to claim 1, wherein:

a period from a start of a torque phase to a completion of the shifting in the transmission is divided into a plurality of predetermined periods;

the storage device is configured to store a plurality of the mapping data each defining the different mapping in accordance with the period; and the execution device is configured to execute, as the change process, a process of selecting the mapping data in accordance with the period when the calculation process is executed.

3. The heat load estimation device according to claim 2, wherein a plurality of the periods include at least one of a first period, a second period, a third period, and a fourth period, the first period being a period from the start of the torque phase to a closing of a pack clearance of the friction engaging element in the transmission, the second period being a period from the closing of the pack clearance of the friction engaging element to a start of an inertia phase in the transmission, the third period being a period from the start of the inertia phase until a differential value of a rotation speed of an input shaft of the transmission becomes equal to or smaller than a specified value, and the fourth period being a period after the differential value of the rotation speed of the input shaft becomes equal to or smaller than the specified value and until the rotation speed of the input shaft reaches a synchronous rotation speed after the shifting is completed.

4. The heat load estimation device according to claim 1, wherein the input variable includes an oil temperature variable that is a variable indicating a temperature (Toil) of a hydraulic oil supplied to the friction engaging element.

5. The heat load estimation device according to claim 1, wherein the hydraulic pressure supplied to the friction engaging element is changed such that the higher an output torque of a prime mover of the vehicle, the higher the hydraulic pressure, and the input variable includes a torque variable that is a variable that indicates the output torque.

6. The heat load estimation device according to claim 1, wherein:

the transmission includes a plurality of the friction engaging elements; and the input variable includes a shifting variable indicating the friction engaging elements that are engaged at the time of the shifting.

7. A heat load estimation method for a friction engaging element that is applied to a vehicle provided with a transmission including the friction engaging element that operates with hydraulic pressure, and that estimates a heat load when at least one of a temperature, a heat generation amount, and presence or absence of seizure in the friction engaging element at a time of shifting of the transmission is regarded as the heat load, the heat load estimation method comprising:

storing mapping data defining mapping, the mapping including, as an input variable, a speed variable that is a variable indicating a relative rotation speed of members of the friction engaging element that rotate relative to each other during the shifting of the transmission and a hydraulic pressure variable that is a variable indicating the hydraulic pressure supplied to the friction engaging element during the shifting of the transmission, and including, as an output variable, the heat load;

executing a calculation process for calculating a value of the output variable by acquiring a value of the input variable and inputting the value to the mapping;

executing a change process for changing a mode of the calculation process during the shifting of the transmission;

prohibiting input of the input variable to the mapping from a start of supply of the hydraulic pressure to the friction engaging element to a start of a torque phase in the transmission as the change process; and executing a process of inputting the input variable to the mapping after the start of the torque phase.

8. A heat load estimation device for a friction engaging element that is applied to a vehicle provided with a transmission including the friction engaging element that operates with hydraulic pressure, and that is configured to estimate a heat load when at least one of a temperature, a heat generation amount, and presence or absence of seizure in the friction engaging element at a time of shifting of the transmission is regarded as the heat load, the heat load estimation device comprising:

a storage device comprising a memory and configured to store mapping data defining mapping, the mapping including, as an input variable, a speed variable that is a variable indicating a relative rotation speed of members of the friction engaging element that rotate relative to each other during the shifting of the transmission and a hydraulic pressure variable that is a variable indicating the hydraulic pressure supplied to the friction engaging element during the shifting of the transmission, and including, as an output variable, the heat load; and a processor programmed to function as an execution device configured to execute a calculation process for calculating a value of the output variable by acquiring a value of the input variable and inputting the value to the mapping, and a change process for changing an execution mode of the calculation process during the shifting of the transmission, wherein:

a period from a start of a torque phase to a completion of the shifting in the transmission is divided into a plurality of predetermined periods;

the storage device is configured to store a plurality of the mapping data each defining the different mapping in accordance with the period; and the execution device is configured to execute, as the change process, a process of selecting the mapping data in accordance with the period when the calculation process is executed.

9. The heat load estimation device according to claim 8, wherein a plurality of the periods include at least one of a first period, a second period, a third period, and a fourth period, the first period being a period from the start of the torque phase to a closing of a pack clearance of the friction engaging element in the transmission, the second period being a period from the closing of the pack clearance of the friction engaging element to a start of an inertia phase in the transmission, the third period being a period from the start of the inertia phase until a differential value of a rotation speed of an input shaft of the transmission becomes equal to or smaller than a specified value, and the fourth period being a period after the differential value of the rotation speed of the input shaft becomes equal to or smaller than the specified value and until the rotation speed of the input shaft reaches a synchronous rotation speed after the shifting is completed.

10. The heat load estimation device according to claim 8, wherein the input variable includes an oil temperature variable that is a variable indicating a temperature (Toil) of a hydraulic oil supplied to the friction engaging element.

11. The heat load estimation device according to claim 8, wherein the hydraulic pressure supplied to the friction engaging element is changed such that the higher an output torque of a prime mover of the vehicle, the higher the hydraulic pressure, and the input variable includes a torque variable that is a variable that indicates the output torque.

12. The heat load estimation device according to claim 8, wherein:

the transmission includes a plurality of the friction engaging elements; and the input variable includes a shifting variable indicating the friction engaging elements that are engaged at the time of the shifting.

* * * * *